Figures 1, 2:
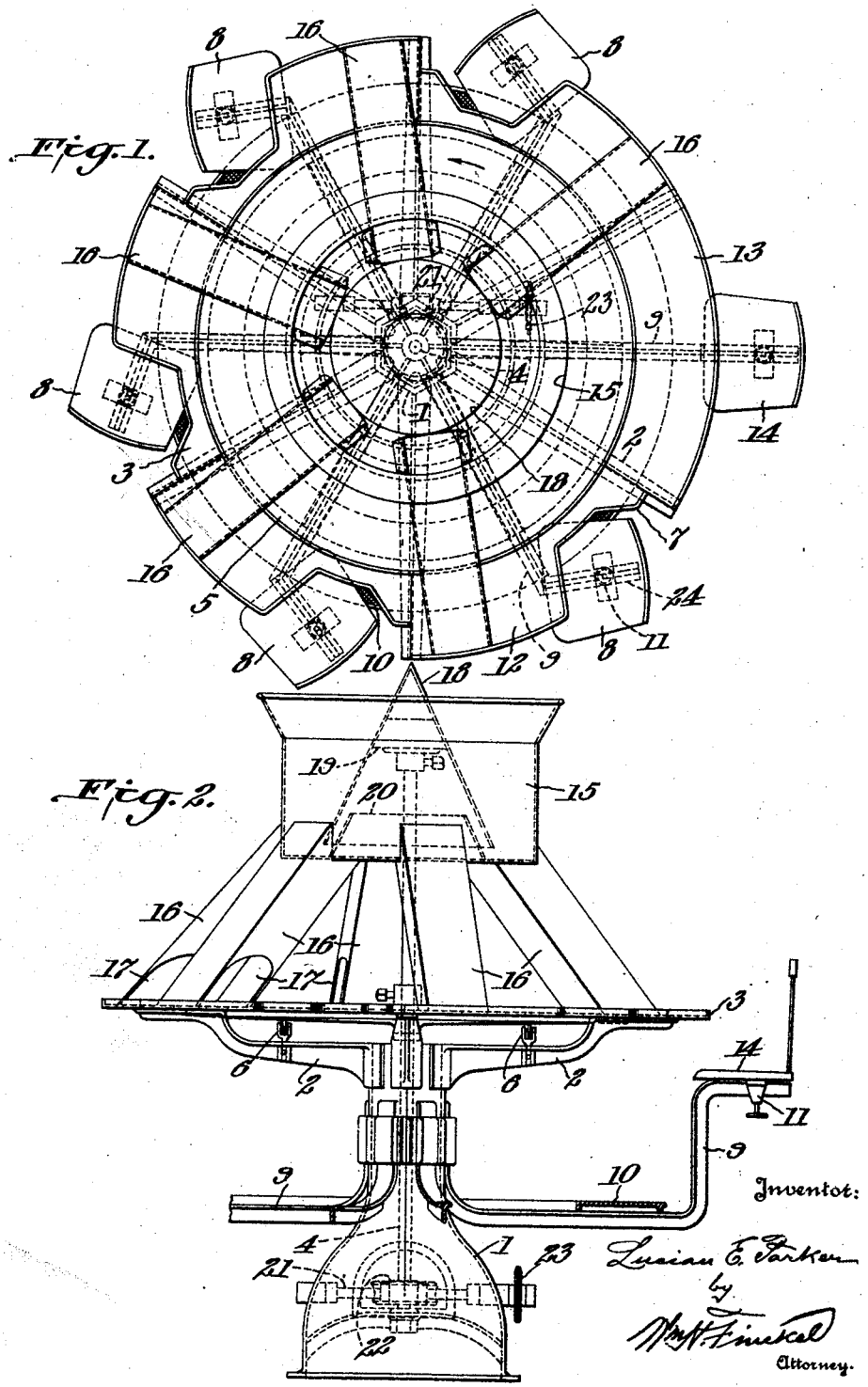

July 14, 1925.

L. E. PARKER 1,545,597

MACHINE FOR USE IN SLIDING MATCH BOXES

Filed Oct. 8, 1923

Inventor:
Lucian E. Parker
by
Attorney.

Patented July 14, 1925.

1,545,597

UNITED STATES PATENT OFFICE.

LUCIAN E. PARKER, OF WADSWORTH, OHIO, ASSIGNOR TO THE OHIO MATCH COMPANY, OF WADSWORTH, OHIO, A CORPORATION OF OHIO.

MACHINE FOR USE IN SLIDING MATCH BOXES.

Application filed October 8, 1923. Serial No. 667,345.

*To all whom it may concern:*

Be it known that I, LUCIAN E. PARKER, a citizen of the United States, residing at Wadsworth, in the county of Medina and State of Ohio, have invented a certain new and useful Improvement in Machines for Use in Sliding Match Boxes, of which the following is a full, clear, and exact description.

The object of this invention primarily is to provide a round table for use in sliding match boxes, that is to say, for facilitating the manual operation of applying the slides or shucks to the filled trays, the round table affording places for a maximum number of operatives on a minimum area of floor space, and the filled trays and the shucks or slides being continuously delivered to the operatives in easy reach of their right and left hands respectively while the machine is running.

The invention consists of a preferably circular table having a rotary inner member to which the filled trays are delivered in any suitable way and traveling toward the operatives, and a surrounding stationary circular outer member composed of five, more or less, individual sections opposite which are seats for the operatives all facing the same way and tangential to the table by preference, and to which the shucks or slides are automatically delivered on the several sections, convenient to the left hand of the operatives, so that the operatives may at the same time pick up a filled tray with the right hand and a shuck or slide with the left hand and assemble them and dispose of the assembled parts in any desired or approved way; the stationary outer member of the table having another section longer than the others with an operative's seat facing it directly, so that this operative may clear the table of any upset or broken boxes or parts of boxes and all scattered matches that may reach this last operative, as I will proceed now to explain and finally claim.

In the accompanying drawings illustrating the invention, in the several figures of which like parts are similarly designated, Figure 1 is a top plan view, and Fig. 2 is a side elevation, the tangentially arranged seats being broken away.

1 is a pedestal on which are fixed a number of radially arranged arms 2, which are fastened to and support the stationary circular sectional outer member 3 of the table. An upright shaft 4 is mounted to turn centrally in the pedestal, and on this shaft and turning with it is the rotary circular inner member 5 of the table. The arms 2 carry bearings 6 containing rollers which contact with the under side of the rotary table member 5 to aid in supporting it and to ensure its proper travel.

The outer stationary member 3 of the table is recessed at five more or less equidistant points 7, and opposite these points are arranged the seats 8 for the operatives, which seats are mounted on brackets 9 fastened to the pedestal in any suitable way and having the individual or continuous foot rest 10. Each seat is provided with a clamping device 11 by which the position of the seat may be adjusted on the supporting bracket 9. These seats are arranged substantially tangential to the table and all of them face in the same direction, that is to say, in the direction of rotation of the rotary table member, as indicated by the arrow, Fig. 1, so that the material placed upon this rotary table will be moved toward the occupants of the seats and within reach of their right hands.

The recesses 7 divide the outer member of the table into five, more or less, sections 12 which form, as it were, individual work tables for the several operatives or occupants of the seats, these sections extending toward the left hand sides of the several operatives, so that both hands of the operatives are free to handle the respective parts of the boxes to be assembled, namely, the filled trays carried to the operatives by the rotary member of the table and the shucks or slides for inclosing the filled trays delivered on the individual work tables. One section 13 of the outer member of the table is somewhat longer than the individual work table sections, and it is arranged between what would be relatively the first and last operatives' seats, and opposite this section 13 is an operative's seat 14 facing the table directly and designed to be occupied by an operative for clearing the table of upset or broken boxes or parts of boxes and of scattered matches incident to the work of the occupants of the seats 8, or otherwise produced, The filled trays may be delivered to the rotary table member by any suitable means, not shown.

The shucks or slides are delivered to the stationary outer member of the table from a stationary hopper 15 which is mounted above the table and connected with the stationary member of the table by means of chutes 16 having openings 17 opening on to the several individual work tables to deliver the shucks or slides from the hopper to the table in front of the several operatives and in convenient reach of their respective left hands. Within this hopper is a cone 18 having the bearing piece 19 by which it may be mounted on the upper end of the shaft 4 to turn with said shaft, said cone serving as a sort of agitator to move the shucks or slides and assist them in escaping from the hopper into the chutes 16. Within the hopper and resting upon and secured to its bottom is a truncated cone 20 which extends up into the cone 18 and serves to prevent the shucks or slides from being jammed beneath the cone 18.

Any suitable means may be used for imparting rotary motion to the shaft 4, and one such means consists of a shaft 21 mounted transversely in the bottom of the pedestal 1 and having a worm gear connection 22 with the shaft and a sprocket wheel 23 which may be connected with the drive installation of the factory in which the round table is used. Of course, each round table may have its own motor.

It will be understood from the foregoing that by the construction described, a main object of the invention is accomplished, namely to concentrate in as small a floor space as possible, the greatest number of operatives for assembling the parts of match boxes, commonly called the sliding operation; and not only so but the arrangement is such as to greatly simplify the work of the operatives and promote convenience of operation.

The only difference between the arms 9 for the seats 8 and the arm 9 for the seat 14 is that in the former case the ends 24 of the arms 9 for the seats 8 are made at an angle to the body of the arms so as to effect the inset or tangential arrangement of the seats, whereas the end of the arm 9 for the seat 14 is continued out straight so as to have the occupant of that seat fronting the work and table directly, all as shown clearly in Fig. 1.

The trays filled with matches are delivered in any suitable way, by hand or by machinery, to the rotary member of the table in spaced relation and carried to the operatives occupying the seats 8, and the shucks or trays are delivered from the hopper 15 through the chutes 16 to the respective work tables in front of the operatives, and the operatives take with their right hands a filled tray and with their left hands a shuck or slide and assemble the two, and then dispose of the thus assembled parts of the boxed matches in any suitable way, while the upset or broken boxes and the scattered matches are carried around to the operative occupying seat 14 and disposed of by said operative as circumstances and the condition of the materials warrant.

While the invention has been shown and described as specially adapted for use in a match factory for assembling the filled trays in their shucks or slides, it is to be understood, of course, that the invention is applicable for sliding boxes containing other things than matches, and the invention is to be understood accordingly.

I have thus described one simple and convenient embodiment of the invention, but it it to be understood that variations are permissible within the principle of the invention and the claims following.

What I claim is:—

1. A table having an outer stationary member recessed at intervals to thereby divide it into individual work tables or sections, seats for operatives extending within said recesses thereby to position the operatives conveniently for performing their work, means for delivering articles to the individual work tables in front of the operatives, and an inner rotary table member traveling toward the operatives and adapted to receive other articles and carry them within convenient reach of the operatives.

2. A table having an outer stationary member recessed at intervals to thereby divide it into individual work tables, seats for operatives projecting into said recesses and all facing one way and preferably so that the left hands of the operatives will be at the outside of the table and the right hands at the inner side and the individual work tables in front of the operatives, means to deliver articles to the work tables in front of the operatives, and a rotary inner table member rotating towards the operatives and serving to carry other articles to the operatives.

3. A table having an outer stationary member recessed at intervals to thereby divide it into individual work tables, seats for operatives inset in said recesses and all facing one way and so that the left hands of the operatives will be at the outside of the table and the right hands at the inner side and the individual work tables in front of the operatives, means to deliver articles to the work tables in front of the operatives and a rotary inner table member rotating towards the operatives and serving to carry other articles to the operatives, the outer table member having a larger section arranged between the first and last of the individual work tables and having an operative's seat arranged to face the same directly to provide for clearing the table of débris.

4. The combination of a pedestal having outwardly projecting arms, a table member stationarily supported upon said arms and recessed to form a series of individual work tables, brackets projecting outwardly from said pedestal, seats supported on said brackets and extending into said recesses, a foot rest on said brackets, an upright shaft mounted to turn in said pedestal, a rotary table member fixed to said shaft and in part supported on said arms, and work-supplying means for said stationary table member.

5. The combination of a pedestal having outwardly projecting arms, a table member stationarily supported upon said arms and recessed to form a series of individual work tables, brackets projecting outwardly from said pedestal, seats supported on said brackets and extending into said recesses, a foot rest on said brackets, an upright shaft mounted to turn in said pedestal, a rotary table member fixed to said shaft and in part supported on said arms, a hopper mounted above the stationary table member and provided with chutes to deliver its contents to the individual work tables, and an agitator in said hopper mounted upon and turning with said shaft.

6. The combination of a pedestal having outwardly projecting arms, a table member stationarily supported upon said arms and recessed to form a series of individual work tables, brackets projecting outwardly from said pedestal, seats supported on said brackets and extending into said recesses, a foot rest on said brackets, an upright shaft mounted to turn in said pedestal, a rotary table member fixed to said shaft and in part supported on said arms, a hopper mounted above the stationary table member and provided with chutes to deliver its contents to the individual work tables, an agitator in said hopper mounted upon and turning with said shaft, and a deflector mounted upon the bottom of the hopper and extending within the cone.

7. A round table for use in sliding matches and for other purposes, comprising an outer circular member, means to support it stationarily, an inner circular member, means to rotate it, a hopper mounted above the table and adapted to discharge its contents at selected places upon the outer circular member, and seats for operatives arranged within the outer member adjacent to and facing the hopper discharge elements.

In testimony whereof I have hereunto set my hand this 6th day of October A. D. 1923.

LUCIAN E. PARKER.

Witnesses:
J. A. CRUMSINE,
W. H. SHENK.